United States Patent [19]

Sizelove et al.

[11] 4,243,352
[45] Jan. 6, 1981

[54] SUSPENSION FOR SILO UNLOADERS

[75] Inventors: Cary L. Sizelove; Donald G. Wells, both of Harvard, Ill.

[73] Assignee: Chromalloy American Corporation, Madison, Wis.

[21] Appl. No.: 37,906

[22] Filed: May 10, 1979

[51] Int. Cl.³ .......................... B65G 65/00; B65G 1/00
[52] U.S. Cl. ................................. 414/313; 414/317; 414/322; 406/114
[58] Field of Search ............... 414/313–322; 406/114; 254/144

[56] References Cited

U.S. PATENT DOCUMENTS

| 593,186 | 11/1897 | Baker | 254/144 |
|---|---|---|---|
| 1,479,990 | 1/1924 | Keys | 414/313 X |
| 2,677,474 | 5/1954 | Long et al. | 414/322 X |
| 2,963,327 | 12/1960 | Seymour et al. | 406/114 X |
| 4,132,450 | 1/1979 | Hansen | 414/322 X |

*Primary Examiner*—Stephen G. Kunin

*Attorney, Agent, or Firm*—Wegner, Stellman, McCord, Wood & Dalton

[57] ABSTRACT

A silo unloader is of the type having a tripod with inwardly and upwardly inclined legs, including a main leg and lateral legs, surmounting the wall of a cylindrical silo, and a silo unloader mechanism has three generally radially extending horizontal support arms to each of which is secured a suspension cable trained over a sheave at the upper end of one of the tripod legs to suspend the mechanism in the silo. Each of the sheaves is journalled in a yoke which is freely suspended at the upper end of a tripod leg, and because of the way the suspension cables must run from the winch to the sheaves, the yokes are displaced from a vertical suspension by the load on the cables. The structure of the support arms permits securement thereto of the three suspension cables at points which compensate for the displacement of the sheave yokes, so as to cause each cable to hang effectively vertically from the sheave over which it is trained.

7 Claims, 5 Drawing Figures

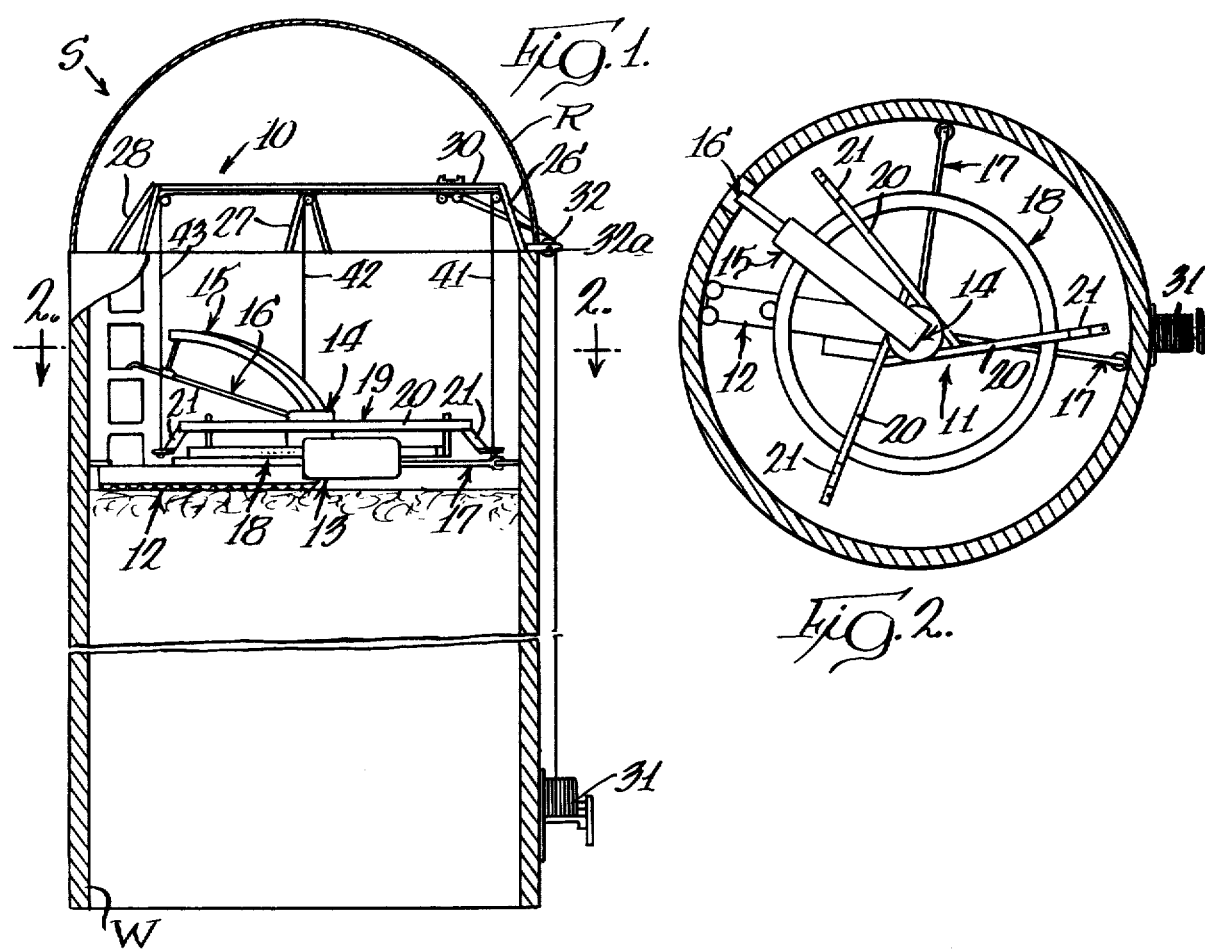
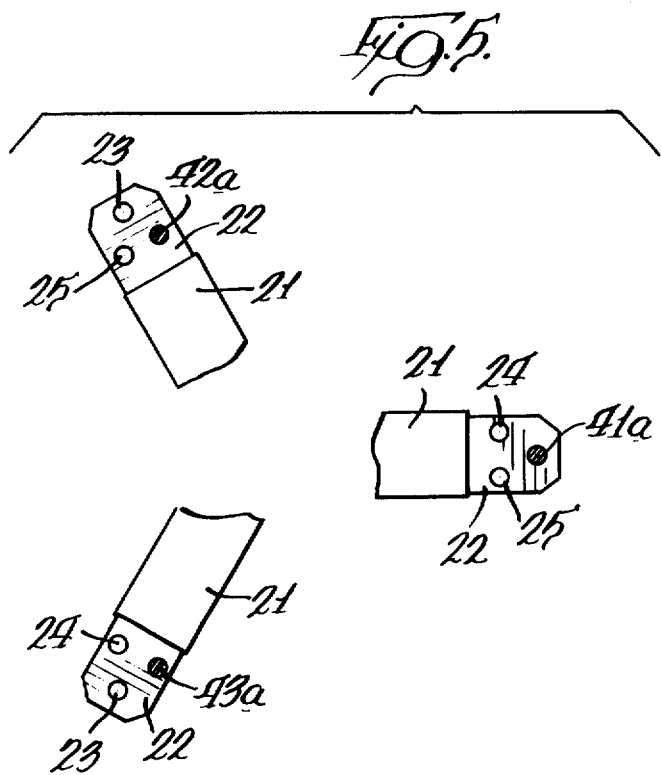

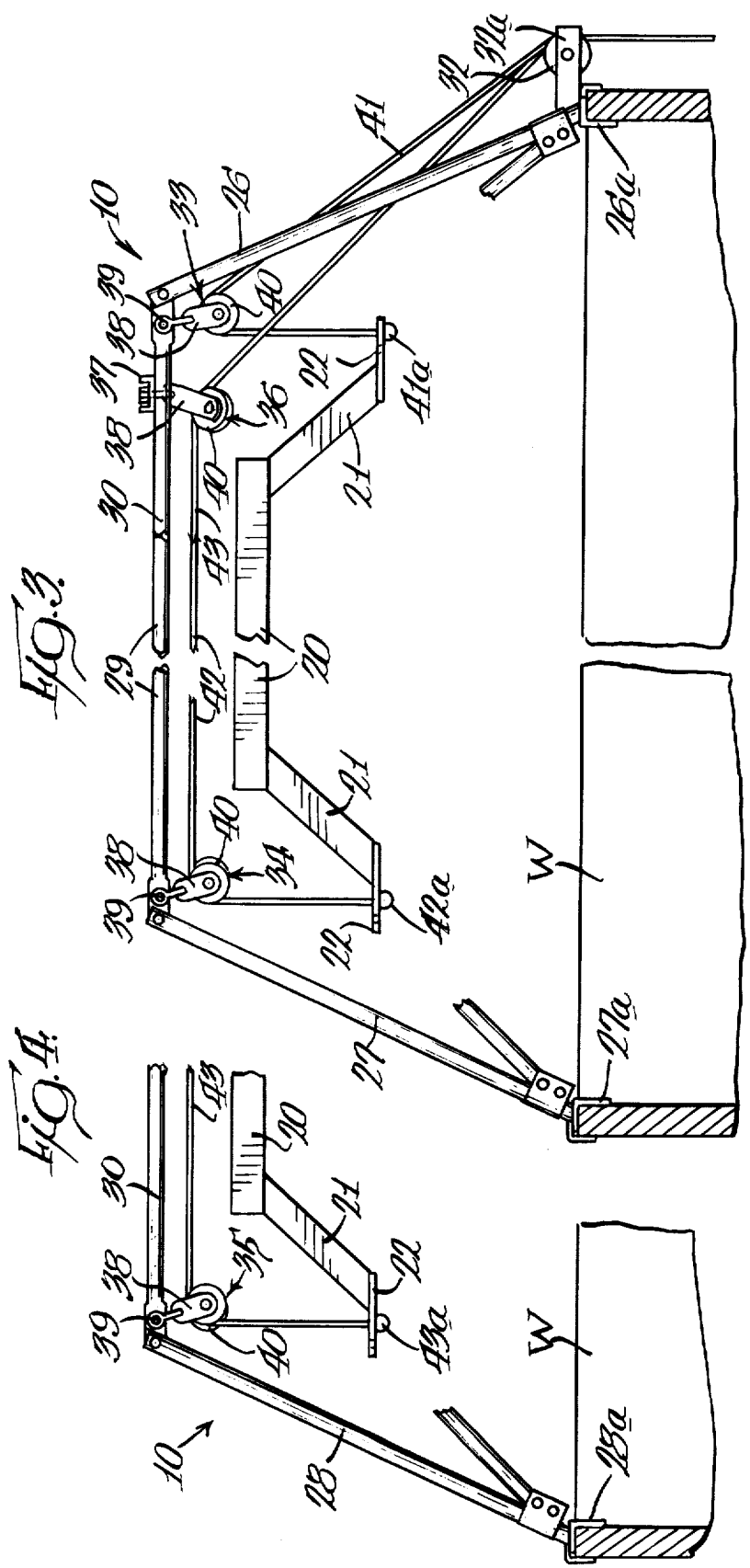

SUSPENSION FOR SILO UNLOADERS

CROSS REFERENCE TO RELATED APPLICATIONS

The offset support arm structure, shown and described in the application, is shown, described and claimed in U.S. patent application Ser. No. 37,907, filed May 10, 1979.

BACKGROUND OF THE INVENTION

Silo unloaders of the type with which the present invention is concerned have an unloader mechanism with three generally radially extending horizontal support arms to receive cables by which the unloader mechanism is suspended from a tripod in the top of the silo for vertical movement under the control of a winch which is near the bottom of the silo wall. Each cable is trained over a sheave that is journalled in a yoke freely suspended at the upper end of the tripod leg, and because of the way the suspension cables must run from the winch to the sheaves, the sheave yokes are displaced from a vertical position by the weight of the silo unloader on the cables. Heretofore the support arms have been constructed for securement of the suspension cables thereto at points directly beneath the suspension points of the sheave yokes. This is the simplest arrangement, because the cables are secured to points which are in exactly the same location on all three support arms. The arms may all be alike and thus may be interchangeable. As a result of the displacement of the yokes from a vertical suspension, the above described arrangement for securing the cables to the unloader mechanism support arms causes the cables to deviate from a true vertical line by the amount of the yoke displacement. This is an insignificant matter when the unloader mechanism is fairly low in the silo, but becomes progressively more important as the unloader mechanism is raised to a position closer to the tripod. When the unloader mechanism is fully elevated to get it out of the way for loading the silo, the suspension cable runs below the sheaves are so short that the angle of displacement places very undesirable lateral stresses upon the tripod legs.

SUMMARY OF THE INVENTION

In accordance with the present invention, the support arms for the silo unloader mechanism are so constructed that the three suspension cables may be secured thereto at points which compensate for the displacement of the sheave yokes, so that each cable hangs effectively vertically from the sheave over which it is trained. As a result, even when the unloader mechanism is elevated as high as possible into the tripod there is substantially no lateral stress upon the tripod legs.

The desired result is accomplished by constructing each of the silo unloader support arms so that it has a suspension cable securement point which is in a location that differs from the securement points on the other two support arms. The securement point on the arm which is below the main tripod leg is located at a predetermined point on the longitudinal median plane of the support arm. The support arm beneath each of the lateral tripod legs is provided with a cable securement point which is displaced laterally from the longitudinal median plane of the support arm and located radially inwardly from a point that corresponds to the predetermined securement point on the first support arm.

Conveniently there is a hole at each securement point which is large enough in diameter for a suspension cable to extend through it, so the free end of the cable may extend through the hole and be provided with a cable fastener of any suitable kind.

In the preferred embodiment illustrated in the drawings, each support arm has an attaching plate at its outer end portion, and each attaching plate is provided with three securement holes which are located correspondingly to the securement points on the three support arms. With this arrangement, any one of the three support arms may be below the main tripod leg.

THE DRAWINGS

FIG. 1 is a fragmentary schematic vertical sectional view of a silo with a silo unloader suspended in it;

FIG. 2 is a schematic sectional view taken substantially as indicated along the line 2—2 of FIG. 1;

FIG. 3 is a fragmentary vertical sectional view illustrating the main leg and one lateral leg of the tripod and the associated unloader mechanism support arms;

FIG. 4 is a fragmentary vertical sectional view illustrating the second lateral leg of the tripod and the associated unloader mechanism support arm; and FIG. 5 is a fragmentary sectional view on a greatly enlarged scale, taken substantially as indicated along the line 2—2 of FIG. 1, but illustrating only the end portions of the three support arms, with the actual points of cable securement.

DETAILED DESCRIPTION OF THE INVENTION

Referring to FIG. 1, a silo, indicated generally at S, has a wall W surmounted by a hemispherical roof R. Surmounting the Wall W is a tripod, indicated generally at 10; and a silo unloader mechanism, indicated generally at 11, is hung from the tripod 10 as will be described herinafter.

The silo unloader 11 is of a well known type which includes a cutter-conveyor pickup arm, indicated generally at 12; an impeller, indicated generally at 13; a collector ring, indicated generally at 14; a discharge chute, indicated generally at 15; a torque arm, indicated generally at 16; and pressure and guide wheels, indicated generally at 17.

A drive ring, indicated generally at 18, is fastened beneath an assembly of support arms, indicated generally at 19; and the drive ring is concentric with the collector ring 14 and has one side overlying the cutter-conveyor pickup arm 12.

The support arm assembly 19 consists of three arms 20 the inner end portions of which define an equilateral triangle surrounding the collector ring 14 and secured to the collector ring casing. The inner ends of the support arms 20 are fixedly secured to one another to provide a very rigid assembly. Each of the support arms 20, outside the drive ring 18, has a diagonally outwardly and downwardly extending offset portion 21 at the end of which is an attaching plate 22 having holes 23, 24 and 25 providing securement points for unloader mechanism suspension cables.

Referring now particularly to FIGS. 3 and 4, the tripod 10 comprises a main leg 26 and lateral legs 27 and 28 which are secured atop the silo wall W by means of respective mounting brackets 26a, 27a and 28a. The three tripod legs are inwardly and upwardly inclined, and at their upper ends are connected by three cross arms such as the cross arm 29 connecting the main leg 26 with the first lateral leg 27, and the cross arm 30 connecting the main leg 26 with the second lateral leg 28. A third cross arm (not shown) connects the two lateral legs.

The suspension means for the silo unloader mechanism 11 consists of a winch 31 which is mounted near the bottom of the silo wall W directly below the main tripod leg 26; distribution sheave means 32 journalled in a bracket 32a at the bottom of the main tripod leg 26; main leg suspension sheave means 33; first lateral leg suspension sheave means 34; second lateral leg suspension sheave means 35; and two guide sheave means such as 36 which are suspended side by side from a support bracket 37 that is mounted between the cross arms 29 and 30 immediately adjacent the main sheave means 33. Each of the sheave means 33-35 includes a yoke 38 which is freely suspended from a pin 39 in one of the tripod cross arms 29 or 30 immediately adjacent the upper end of the associated tripod leg; and the guide sheave means 36 include yokes 38 which are freely suspended from the member 37. Journalled in each of the yokes 38 is a sheave 40.

Operatively connected to the winch 31 and trained over the distribution sheave means 32 are a main leg suspension cable 41, a first lateral leg suspension cable 42, and a second lateral leg suspension cable 43. The suspension cable 41 is trained directly over the sheave 40 of the suspension sheave means 33; while each of the lateral suspension cables 42 and 43 is trained over the sheave 40 of one of the guide sheave means 36 and then over the sheave 40 of the suspension sheave means 34 or 35. The suspension cables 41, 42 and 43 have respective free ends 41a, 42a and 43a which extend through one or another of the holes 23, 24 or 25 in the support arm attaching plates 22.

As seen in FIG. 5, the main cable end portion 41a extends through the securement point hole 23 which is on the longitudinal median plane of the support arm 20 beneath the main tripod leg 26; the cable end portion 42a extends through the cable securement hole 24 which is offset laterally in one direction from the median plane and is located radially inwardly with respect to the predetermined position of the hole 23; and the suspension cable end portion 43a extends through the securement point hole 25 which is laterally displaced oppositely from the hole 24 and the same distance radially inwardly with respect to the hole 23.

The securement points for the three cables 41, 42 and 43 are so arranged as to compensate for the displacement of the respective suspension sheave means 33, 34 and 35 which results from the fact that all three suspension cables have lateral runs between the distribution sheave means 32 and the respective suspension sheave means.

The foregoing detailed description has been given for clearness of understanding only and no unnecessary limitations should be understood therefrom as modifications will be obvious to those skilled in the art.

We claim:

1. In a silo unloader of the type having a tripod surmounting the wall of a cylindrical silo, said tripod having inwardly and upwardly inclined legs including a main leg and lateral legs at opposite sides of said main leg, cross arms connecting the upper ends of said inclined legs, a suspension sheave adjacent the upper end of each tripod leg, each sheave being journalled in a freely suspended yoke, distribution sheave means journalled in a fixed bracket at the bottom of the main leg, a winch mounted on the exterior of the silo below said distribution sheave means, three suspension cables operatively connected to the winch and trained over the distribution sheave means, each of said cables extending transversely from the distribution sheave means and being trained over one of said suspension sheaves, and a silo unloader mechanism having three effectively horizontal and generally radially extending support arms each of which receives one of said cables to suspend the unloader mechanism in the silo, the weight of the unloader displacing the sheave yokes from the vertical, the improvement comprising:

each of said support arms has an outer end portion which is directly below the suspension point of one of the sheave yokes at the upper ends of the tripod legs, the outer end portion of the arm below the main tripod leg is constructed and arranged for securement thereto of a suspension cable at a first predetermined securement point, and the outer end portion of each of the arms below the lateral tripod legs is constructed and arranged for securement thereto of a suspension cable at another predetermined securement point which is located to compensate for the displacement of the sheave yoke thereabove so as to cause each cable to hang effectively vertically from the sheave over which it is trained.

2. The improvement of claim 1 in which the first predetermined securement point is on the longitudinal median plane of the support arm, and each of the other predetermined securement points is displaced laterally from the longitudinal median plane of the support arm and located radially inwardly from a point corresponding to said first predetermined securement point.

3. The improvement of claim 2 in which each support arm has a hole at the securement point.

4. The improvement of claim 3 in which each hole is large enough in diameter for a suspension cable to extend through it.

5. The improvement of claim 2 in which the outer end portion of each support arm comprises an attaching plate, and each attaching plate is provided with three securement points which are located correspondingly to said first securement point and to each of said other securement points, whereby any one of the three support arms may be below the main tripod leg.

6. The improvement of claim 5 in which there is a hole at each of said three securement points.

7. The improvement of claim 6 in which each hole is large enough in diameter for a suspension cable to extend through it.

* * * * *